(12) United States Patent
Grush

(10) Patent No.: US 8,140,265 B2
(45) Date of Patent: Mar. 20, 2012

(54) PRIVATE, AUDITABLE VEHICLE POSITIONING SYSTEM AND ON-BOARD UNIT FOR SAME

(75) Inventor: Bernard Grush, Toronto (CA)

(73) Assignee: Skymeter Corporation, Toronto, Ontario (CA)

( * ) Notice: Subject to any disclaimer, the term of this patent is extended or adjusted under 35 U.S.C. 154(b) by 1390 days.

(21) Appl. No.: 11/688,977

(22) Filed: Mar. 21, 2007

(65) Prior Publication Data

US 2007/0225912 A1  Sep. 27, 2007

Related U.S. Application Data

(60) Provisional application No. 60/783,855, filed on Mar. 21, 2006, provisional application No. 60/858,728, filed on Nov. 14, 2006.

(51) Int. Cl.
*G01C 21/00* (2006.01)

(52) U.S. Cl. .................................................. 701/468

(58) Field of Classification Search ............. 701/213, 701/207–211, 217, 117, 102, 200, 212; 340/988, 340/990; 702/94, 95, 150
See application file for complete search history.

(56) References Cited

U.S. PATENT DOCUMENTS

| | | | | |
|---|---|---|---|---|
| 5,075,693 A | * | 12/1991 | McMillan et al. | ............ 342/457 |
| 6,192,312 B1 | * | 2/2001 | Hummelsheim | ............ 701/118 |
| 6,597,987 B1 | * | 7/2003 | Barton | ............ 701/213 |
| 6,751,535 B2 | * | 6/2004 | Mori | ............ 701/23 |
| 7,266,477 B2 | * | 9/2007 | Foessel | ............ 702/189 |

* cited by examiner

*Primary Examiner* — Dalena Tran
(74) *Attorney, Agent, or Firm* — Patterson & Sheridan, L.L.P.

(57) ABSTRACT

This invention relates to a system and method to generate a private, auditable, evidentiary quality record of the location-history of an asset or person. This invention addresses ten critical improvements over existing systems that are proposed or used for metering for payment services for tolling roads, parking or pay-as-you-drive insurance, namely, cost-effective location accuracy in harsh signal environments, evidentiary assurance of location estimation, handling of dynamic and stationary positioning in a single device, high-ratio compression for a set of stationary positions in urban canyon, high-ratio compression for a dynamic tracklog in urban canyon, high-ratio compression for a set of asset motion behaviors, a method of remote device health check, including anti-tampering, removal of residual price assignment errors, anonymous use without on-board maps, and a method of deconsolidating payments to multiple payees with multiple payment regimes. This system can be applied to road-pricing, congestion-pricing, metered-by-the-minute parking and pay-as-you-drive insurance, incorporating privacy management, and legal admissibility of the evidentiary record. This same device can also be applied to vehicular fleets, military ordinance, or other location audits for assets whether motorized or not, as might be needed in evidence of contract fulfillment or other forms of non-realtime geofencing audits.

4 Claims, 8 Drawing Sheets

Figure 5 has two parts 5.1 and 5.2
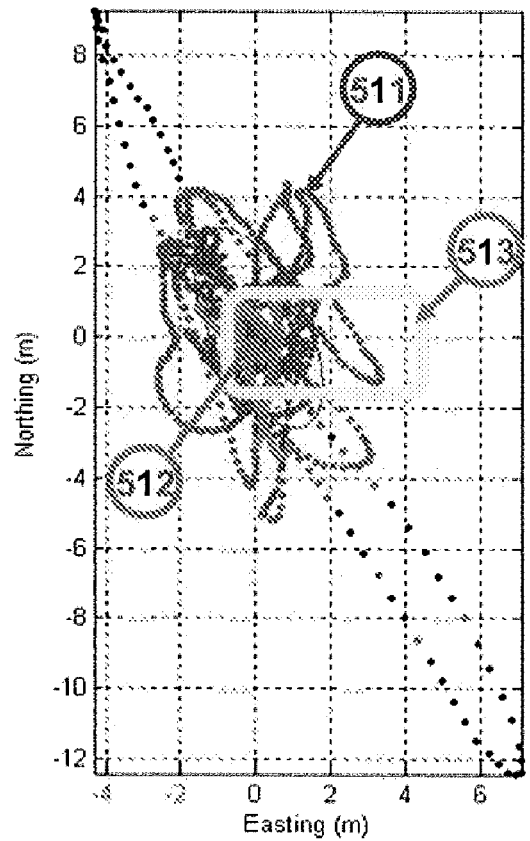
Figure 5.1
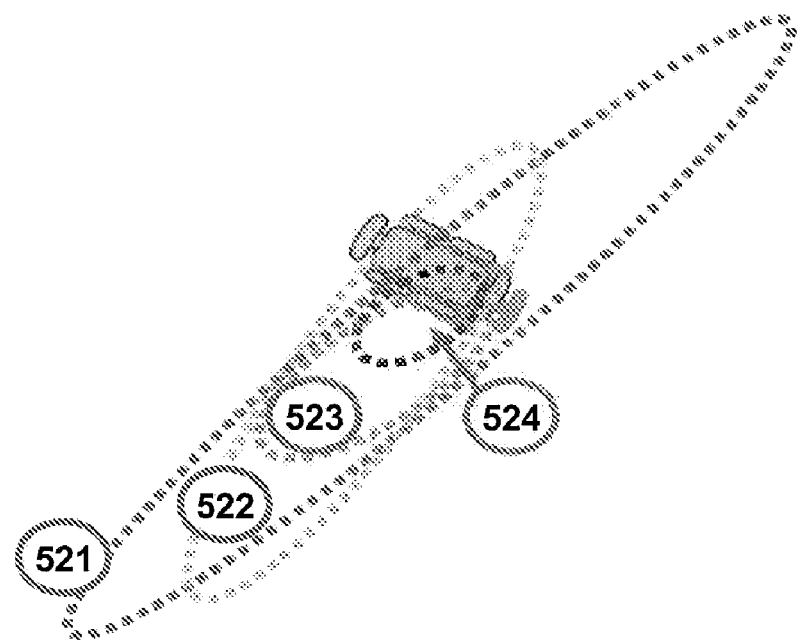
Figure 5.2

Figure 6 has seven parts: 6.1 through 6.7
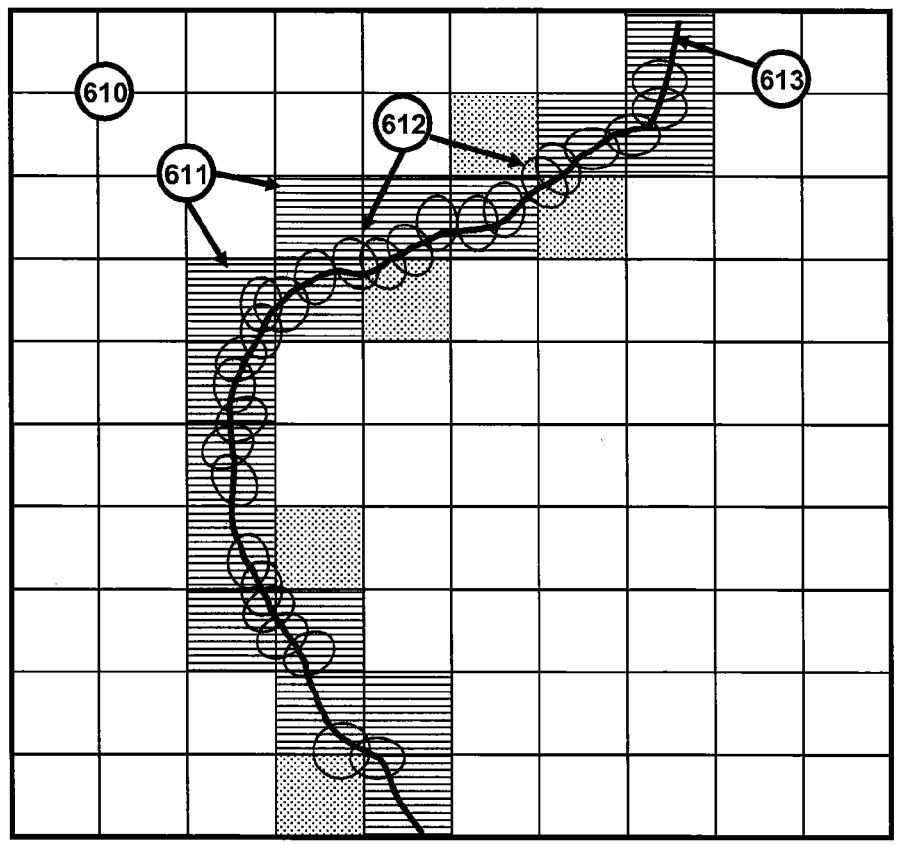
Figure 6.1
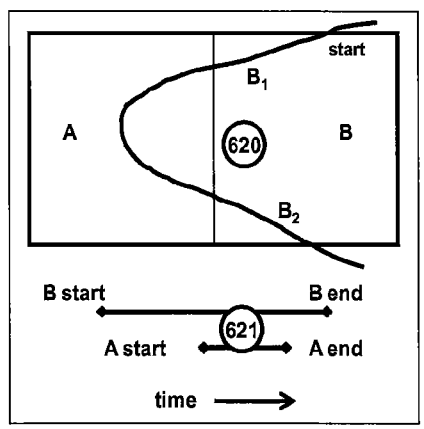
Figure 6.2
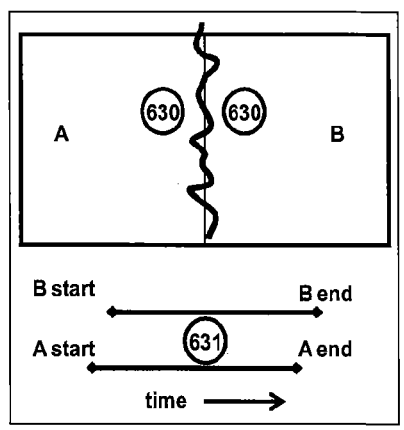
Figure 6.3
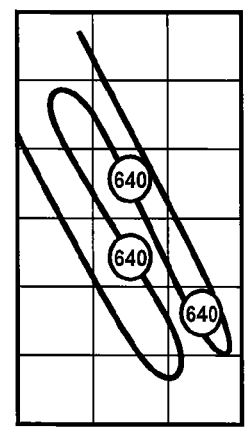
Figure 6.4

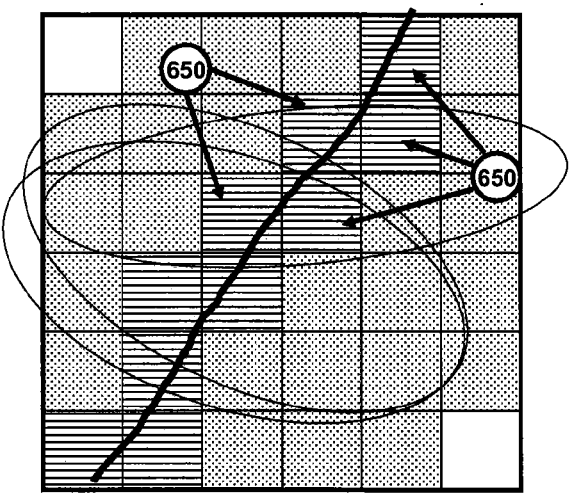
Figure 6.5
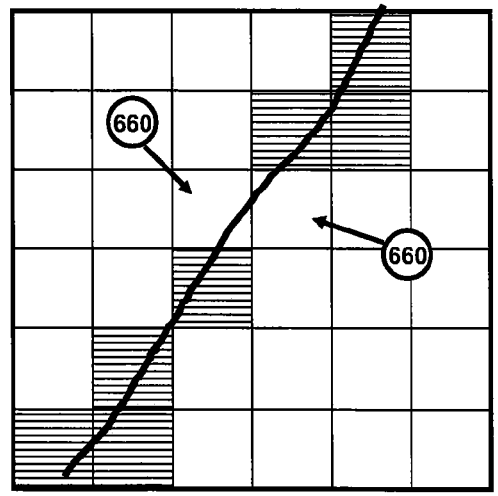
Figure 6.6
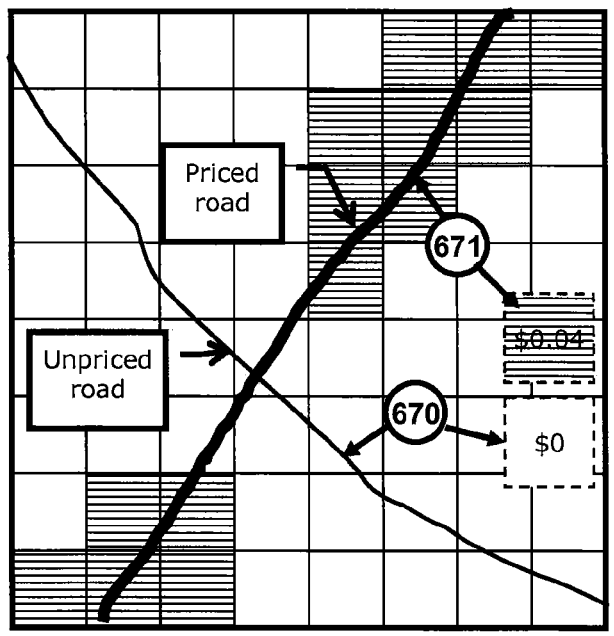
Figure 6.7

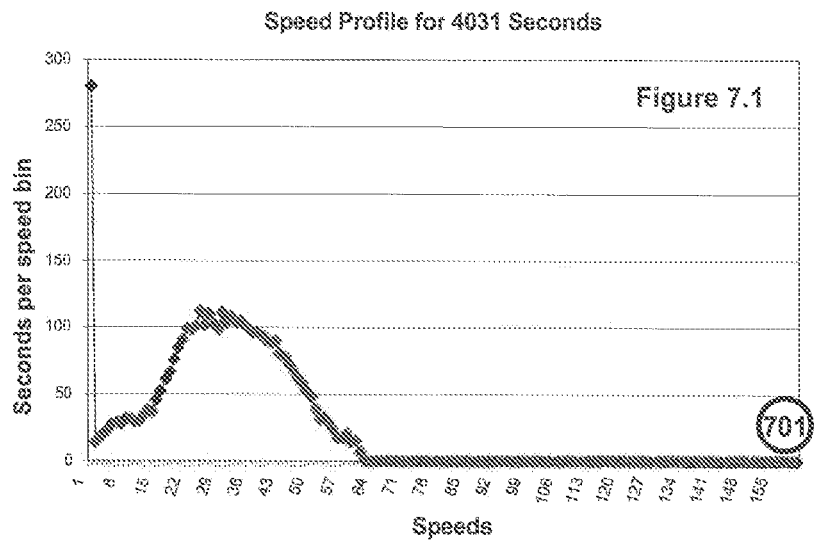
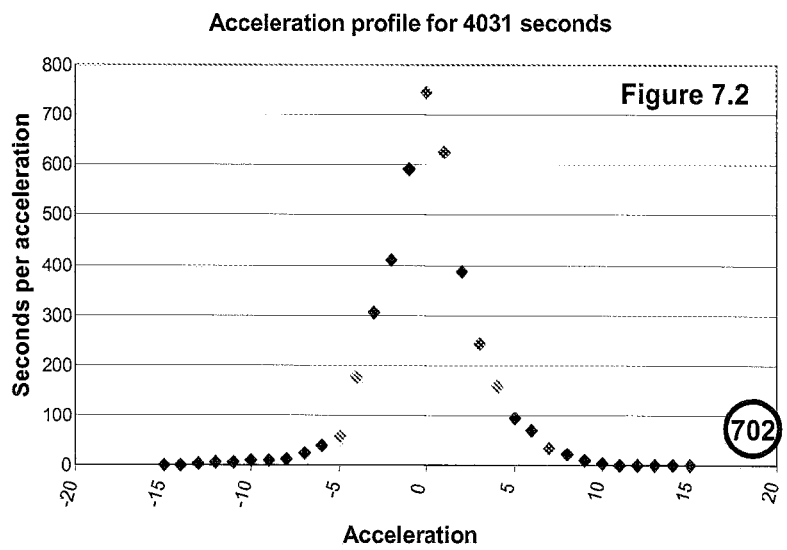
Figure 7: two parts: 7.1 and 7.2
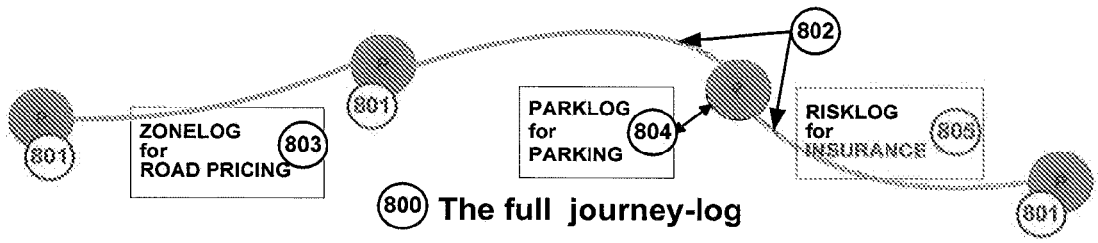
Figure 8

Figure 9 has two parts 9.1 and 9.2
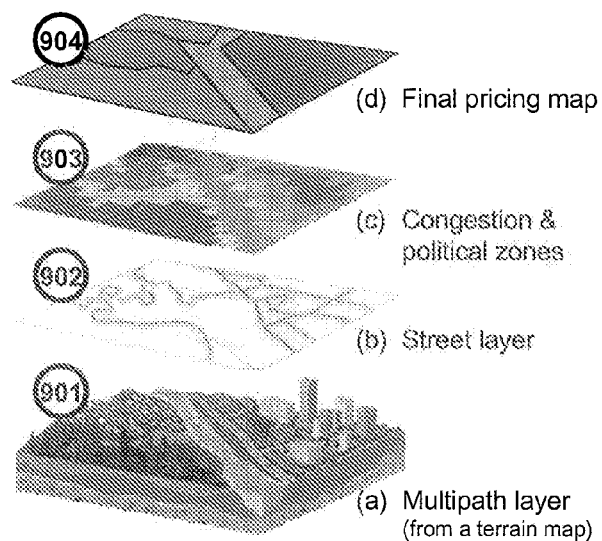
Figure 9.1
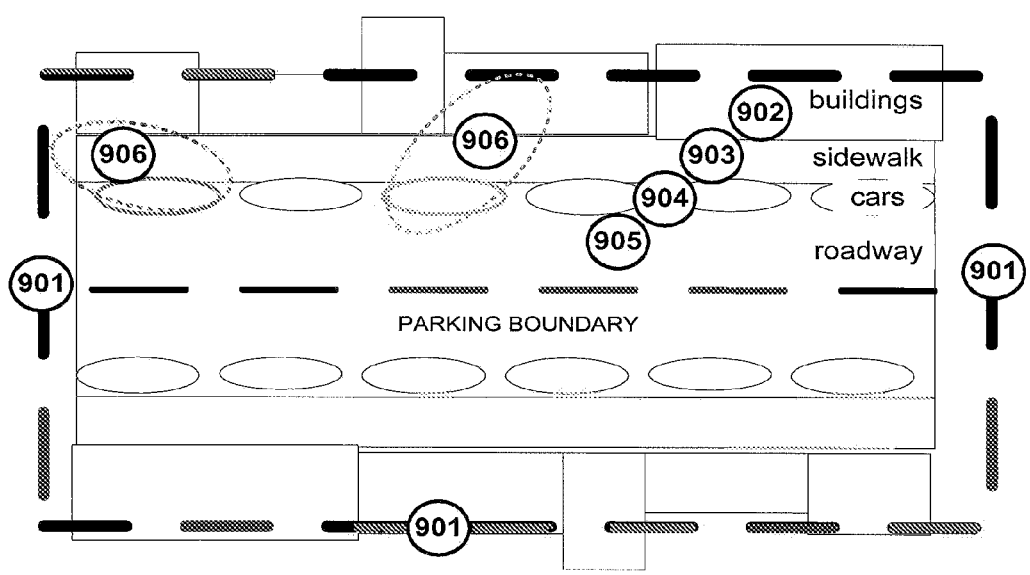
Figure 9.2

Figure 10 has two parts: 10.1 and 10-.2
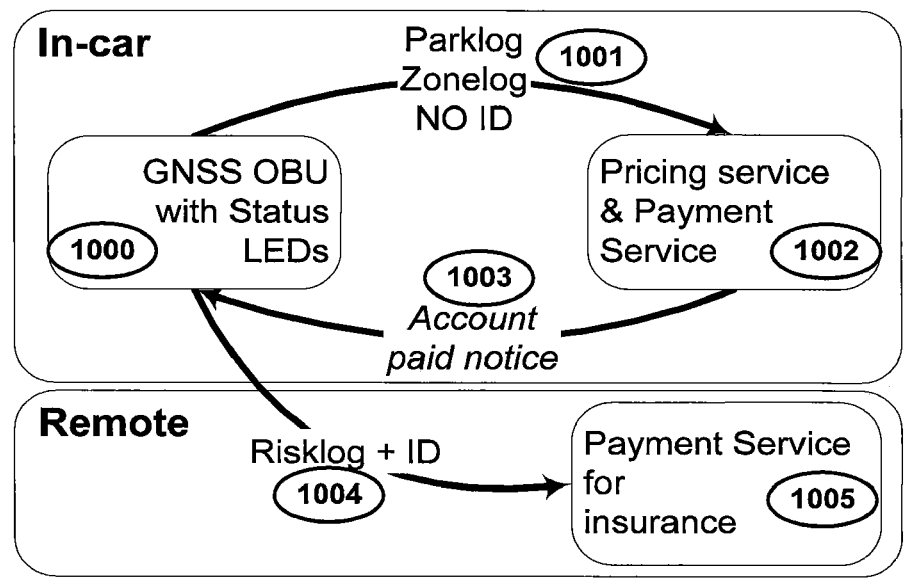
Figure 10.1
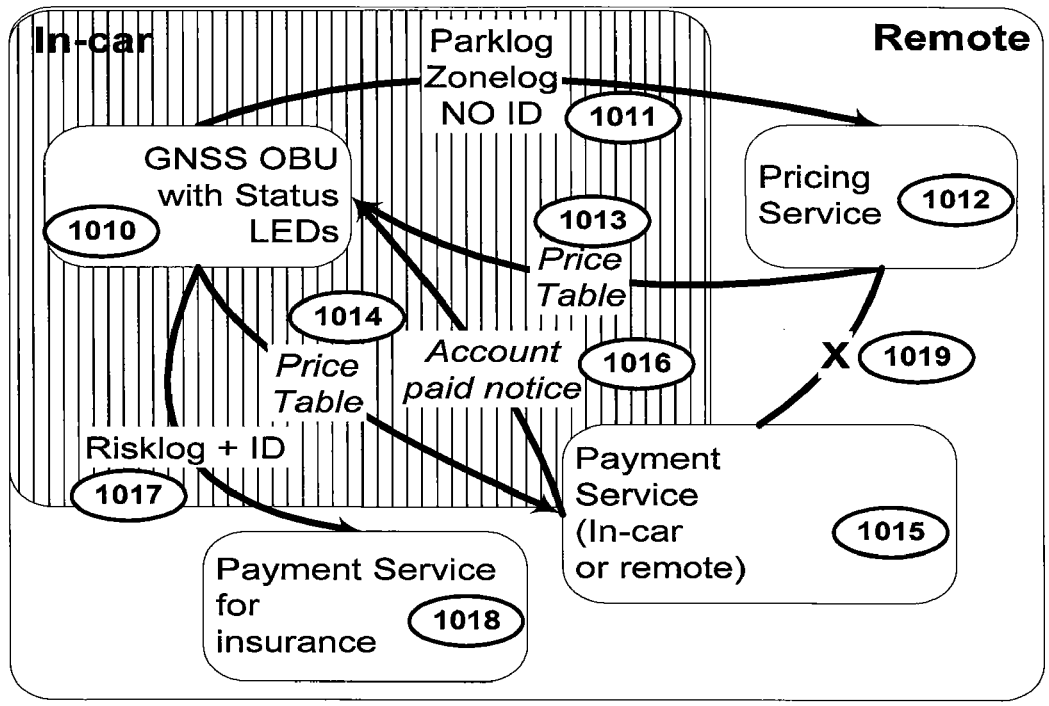
Figure 10.2

PRIVATE, AUDITABLE VEHICLE POSITIONING SYSTEM AND ON-BOARD UNIT FOR SAME

CROSS-REFERENCE TO RELATED APPLICATIONS

This application claims benefit of U.S. provisional patent application Ser. No. 60/783,855, filed Mar. 21, 2006, and U.S. provisional patent application Ser. No. 60/858,728, filed Nov. 14, 2006.

FIELD OF THE INVENTION

The present invention lies in the field of Global Navigation Satellite System (GNSS) receivers and related applications.

BACKGROUND OF THE INVENTION

Automotive congestion, whether of roads, streets, highways or parking spaces, is due to excessive demand for these facilities, and causes harm to the commercial and personal productivity of the businesses and people living in the area near and surrounding congested roads and areas. Automotive congestion also raises the levels of noxious automotive emissions that have known air-quality and related health effects and either concentrate in that local area or may spread more widely. Furthermore, automotive congestion is known to raise the risk of personal injury, death, or property damage due to crashes for those vehicles that are moving on congested facilities.

The ability of fuel taxes to financially support road building, operation and maintenance is waning as vehicles become more fuel efficient or use alternate fuels. Moreover, fuel taxation does not distinguish between congested and uncongested roads and times, hence offering road authorities no ability to design pricing signals that could be used to control congestion. (Pricing signals can be used to tell motorists it is more costly to drive in congested areas or at congested times.)

For these several reasons road and government authorities are studying and preparing for the impending change to a reduction in open (free) access to roads and an increase in more comprehensive road and parking pricing programs.

Since 2003, it has been expected that many jurisdictions such as, but not limited to countries, regions, states, provinces, and municipalities will begin engaging in large area road tolling and parking tolling, whether for purposes of controlling automotive congestion, automotive emissions and/or to raise revenue.

The technology of choice to enable this activity is Global Navigation Satellite Systems (GNSS). GNSS such as GPS, GLONASS, Galileo and the planned Compass have many applications. These range from guiding aircraft and weaponry to precision timing of financial transactions. In between are many tens of other applications such those for surveying, tracking, asset management and well-known land, water and personal navigation. Each of these applications has different accuracy, precision, speed and cost demands.

The task of using GNSS signals for charging for use of infrastructure such as roads or parking has a unique body of constraints and requirements that are not satisfied by GNSS-based navigation or asset tracking systems, in particular, a fully effective system must:
1. meter road use for tolling regardless of tolling architecture, including road segment(s), area, zone, cordon, distance-based, congestion pricing, time, location, and duration
2. meter parking use including surface lots, parking garages, and street parking
3. meter for liability insurance including time, distance, speed, acceleration, congestion, and location
4. work in built-up areas where radio signals may be severely disturbed by multipath
5. work while a vehicle is stationary
6. work while a vehicle is moving up to 150 mph,
7. work while a vehicle is changing speeds frequently (such as in heavy congestion)
8. be tamper-proof
9. incorporate a device that is remotely able to report its state of health regarding tamper or accidental failure
10. have no user interface for inputs (for security and greater reliability)
11. be able to communicate wirelessly over short distances to send data to a separate local device for applications, including $3^{rd}$-party applications, which may itself have a user interface
12. be able to communicate wirelessly over long distances
13. be able to operate anonymously to protect the ID and personal information about a vehicle owner or operator
14. be interoperable according to the requirements of the EU or other jurisdiction that requires interoperability with existing Electronic Toll Collection (ETC) Systems
15. be able to distinguish adjacent lanes of travel anywhere where multipath is not severe (e.g. outside of central business districts of cities)
16. incorporate an ability to pay negative tolls, for example to reward non-use of a vehicle at peak traffic times
17. be able to deconsolidate fees/charges due to multiple tolling authorities, multiple parking operators and at least one insurance firm from a single data feed from a vehicle For these requirements, a complete set of solutions is not currently available.

There are already numerous instances of GNSS-enabled devices in trial and even full systems in deployment for road-charging and insurance-metering systems. However, none of these work satisfactorily in harsh signal environments, in particular in the downtown "urban canyon" where they are most critically required. Specifically, existing devices have one or more of the following problems. They:
1. do not work satisfactorily in steep terrain or built-up areas ("urban canyon")
2. do not provide an auditable evidentiary record such as is needed in non-refutable financial application (such as charging for road or parking use)
3. are difficult to maintain because they require volatile data on board (such as maps to be used in error masking algorithms for navigation, called "map-matching").
4. are costly because they require assistance from other technology (such as inertial navigation or on-board map matching)
5. do not handle both privacy and auditability; moreover require an on-board payment capability to provide privacy
6. only handle one pricing regime, such as road-tolls or insurance premiums, and for only a single pricing authority in the case of GNSS-based tolling To build a workable and acceptable GNSS-based tolling system, all of these issues must be addressed.

SUMMARY OF THE INVENTION

It is an object of the invention to overcome the foregoing limitations of the prior art.

According to a first aspect of the present invention, an on-board unit is provided for tracking the position of a vehicle that is moving or stationary. The unit comprises:
(a) a GNSS receiver, including an antenna, for receiving positioning data with respect to the vehicle's position in timed intervals;
(b) a processor in communication with the receiver and programmed for:
  (i) determining if the vehicle is moving or stationary;
  (ii) processing the positioning data to generate an estimated position of the vehicle by mitigating multipath error in the positioning data,
    for the moving vehicle by:
      applying a fault detection and elimination algorithm;
      applying a forward and reverse constraint analysis; and
      calculating speed data and acceleration data of the vehicle;
    and
    for the stationary vehicle by:
      applying a fault detection and elimination algorithm;
  (iii) compiling a zonelog of the positioning data with respect to the vehicle while moving;
  (iv) compiling a parklog of the positioning data with respect to the vehicle while parked;
  (v) compiling a risklog of the positioning data comprising a compilation of the zonelog marked with the speed data represented as a speed profile and the acceleration data represented as an acceleration profile of the vehicle; and
(c) a memory and a wireless means to store the processed positioning signals after processing, and to forward them as separate positioning data streams to a system to enable billing a user of the vehicle for use of the vehicle according to the zonelog, parklog and risklog.

The unit may further apply signal weighting to improve the position estimate for either the moving or the stationary vehicle. The unit may further apply wavelet transforms and analysis to improve the position estimate for the stationary vehicle. The unit may further apply cluster analysis to improve the position estimate for the stationary vehicle.

Preferably, the processor is further programmed for assessing and ascribing a position estimate characterization with respect to the estimated position to be compiled, stored and forwarded with the zonelog, parklog and risklog streams.

The processor may be further programmed for compressing the zonelog or the parklog or the risklog prior to storing and forwarding.

The processor may be further programmed for detecting possible tampering with the receiver and for wirelessly forwarding a status message to the billing center on detection of possible tampering.

Having regard to the pricing and billing functions, various options are possible.

The pricing and billing functions may be carried out by a single organization or entity. Thus, the system may comprise a billing (and pricing) center capable of receiving the zonelog, parklog or risklog and calculating at least one amount payable by the user, remittable to the (same) billing center.

Alternatively, the pricing and billing functions may be carried out by separate pricing and billing organizations or entities. Thus, the system may comprise a pricing center capable of receiving the zonelog, parklog and risklog and calculating at least one amount payable, which is returned to the on-board unit for transmission to a billing center, and the processor is programmed to conceal at least the zonelog and parklog from the billing center.

The on-board unit may further comprise a payment instruction receiving means. The processor may be further programmed to return a message to the billing center that a payment instruction was received. The processor may be further programmed to conceal the identity of the user from the pricing center.

In certain embodiments, it may be set up that the amount payable is to be allocated to multiple payees. In the on-board unit, the processor may be further programmed to conceal the identity of the user from the payees.

BRIEF DESCRIPTION OF THE FIGURES

FIGS. 5.1 and 5.2 are plotted illustrations of the effect of RAMM on the ability to remove multipath errors for a stationary receiver.

FIG. 6.1 is a graph illustration of a GNSS grid on which is plotted a statistically most probable path of the tracked vehicle.

FIGS. 6.2 through 6.4 are illustrations of various cases of vehicle movement between adjacent cells.

FIG. 6.5 is an illustration of compression of noisy position data.

FIG. 6.6 is an illustration of gaps that may occur in a raw zonelog.

FIG. 6.7 is an illustration of pricing map adjustments as they may be applied to avoid overcharging users.

FIGS. 7.1 and 7.2 are illustrations of speed and acceleration profiles used for risklog determination.

FIG. 8 is an illustration of a concatenated zonelog, parklog and risklog in a single journey log.

FIG. 9.1 is a simplified illustration of information layers used to construct a pricing map.

FIG. 9.2 is a graph illustration of parking area bounding.

DETAILED DESCRIPTION

Figure 1:
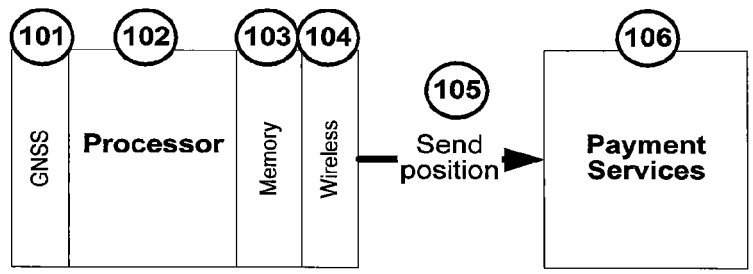
FIG. 1 is a schematic drawing of the components of Vehicle Positioning Systems (VPS) generally.

The present invention focuses on ten improvements over the prior art. Each of these capabilities is embodied fully or partially in an on-board hardware device. Variances from this are described at the description for each capability, below.

Taken together, the key value of the first eight elements is that onboard position estimates are more accurate (closer to the road or lane of travel or closer to the parking spot), better behaved (smoother for more accurate distance measurements), amenable to extraordinarily rapid matching to a price map, far more compressible (hence cheaper to store, transmit and process), and fully auditable at every second.

One of the most critical goals of this invention is to meter road use sufficiently accurately so that:
  No vehicle is overcharged for road use. Since multipath error can generate an erroneous position for a vehicle in built-up areas (urban canyon), it is possible to charge an incorrect, possibly higher charge, unless mitigation, specific to this problem, is undertaken.

Every journey taken on the same roads, under the same pricing regime, will be tolled at the same amount (within a very small error). We refer to this as "pricing invariance".

A road authority will be assured of no revenue loss, due to these calculations that ensure no overcharging and price invariance.

The ten improvements are:

1. RAMM. Receiver autonomous multipath mitigation for cost-effective accuracy in harsh signal environments, which uses numerous GNSS signals related ancillary data and digital signal processing techniques. This is fully embodied on a specialized hardware processor at the OBU.

2. PEC: Position estimate characterization for evidentiary assurance of location estimation, which uses error measures captured during the RAMM process and specific statistical representations, so that the process error is apparent and bounded at every measurement (for example, every second). This ensures that the device and its process are auditable. This is fully embodied on a specialized hardware processor at the OBU.

3. Dual State Handling: Dynamic positioning ("zonelog") and stationary positioning ("parklog") that is both accurate and auditable in a single device, which requires detecting whether the receiver is moving or stationary and applying the invention's RAMM and PEC processes in two different manners depending on the receiver state of motion. This is fully embodied on a specialized hardware processor at the OBU.

4. Parklog: A highly-compressed characterization of each parking episode including start-time, end-time, estimated position, and an integrity measure for each position estimate, specifically designed for tolling for stationary (parked) receivers. This is fully embodied on a specialized hardware processor at the OBU.

5. Zonelog: A highly-compressed characterization of a trip segment with position, time, location and integrity information, specifically designed for tolling for moving (driving) receivers. Zone resolution can range from 2 $m^2$ to 1000 $m^2$. 2 $m^2$ zones are useful for metering HOT lanes in open sky for differential pricing by lane 50 $m^2$ is suitable for Central Business District (CBD) cordon applications, while 100 $m^2$ to 1000 $m^2$ is suitable for exurban or rural cordoned applications. This is fully embodied on a specialized hardware processor at the OBU.

6. Risklog: A highly-compressed characterization of a trip segment including critical zonelog information plus speed and acceleration profiles, specifically designed for capturing actuarial evidence for insurance. This is fully embodied on a specialized hardware processor at the OBU.

7. Tamper-check: Signal- and pattern-recognition-based methods of remotely-confirmable device-health, which is comprised of novel tamper-detection techniques specific to certain properties of the two data logs (Zonelog and Parklog) in combination with prior art regarding hardware self-checks which are not novel. The generation of this information is fully embodied in hardware the OBU, and the interpretation and use of the health-message is made at the remote data center.

8. Price Assurance: Removal of residual price assignment errors (to remove the risk of overcharging), which is comprised of a set of geographic information system (GIS) techniques applied to specially formulated "multipath severity" maps in a one-time setup activity that produces a specialized map that is specific to each geographic region. The generation of this specialized map is embodied in a body of computer software independent of the OBU or the payment facility. This specialized map is then used in the payment facility with data from the OBU.

9. Location Privacy: Travel privacy and anonymity, without the use of on-board maps is provided by considering the OBU as the master device from the users perspective instead of a data collection device (which is what it is). This method separates location data from vehicle ID and vehicle ownership data in a way that no person, machine or facility permitted to see location data can see ID data and no person, machine or facility permitted to see ID data can see location data. This is embodied and controlled in the OBU, but requires a working protocol with a remote pricing facility and a remote payment services facility. Both the onboard control component and the approach of mutual isolation of pricing and payment services are part of this invention.

10. Payment Deconsolidation: A procedure to evaluate a payment due from a registered vehicle owner for the use of one or more of roads, parking spots or for insurance premiums, for whom there are a plurality of road authorities, a plurality of parking operators and a plurality of insurance companies. Said procedure is able to deconsolidate and correctly direct the payments for road and parking use without disclosing the identity of the registrant of the motor vehicle, but while assuring that the account for the vehicle in question is "in good order". This cannot be done for an insurance premium payment because the nature of liability requires identity. It is possible in this invention, however, to keep the specific roads of travel private to the motorist in relation to the insurance company(ies).

Before describing each of these improvements in greater detail, it is worthwhile to point out some comparisons to existing systems. The data-collection core of the current invention is superficially similar to existing GNSS-based asset management systems (AMS). However there are key differences.

For clarity, these are:

1. An AMS provides position estimates; this invention provides an evidentiary record
2. An AMS position is approximate; this invention position is assured via statistical characterization
3. An AMS position is transient; in this invention position is auditable
4. An AMS provides search-and-manage capabilities; this invention provides billing and auditing capabilities
5. Data output by an AMS is generally real-time and uncompressed; this invention uses batch and compressed transmission.

As a background illustration, the basic components of a "Vehicle Positioning Systems" (VPS) are illustrated in FIG. 1. A basic VPS consists of a GNSS receiver, and a method of collecting and forwarding its position estimates to a facility that will calculate a usage-fee, operate a security application, manage a fleet of working vehicles, or other location-based application.

In simplified overview, both the prior art of VPS and the current invention works as follows: GNSS signals are received at an on-board unit (OBU) in the vehicle. The OBU estimates the position of the vehicle, a record of those positions (possibly compressed) is then forwarded to another on-board device or stored-and-forwarded to a remote data center, wirelessly or otherwise, for payment processing.

Figure 2:
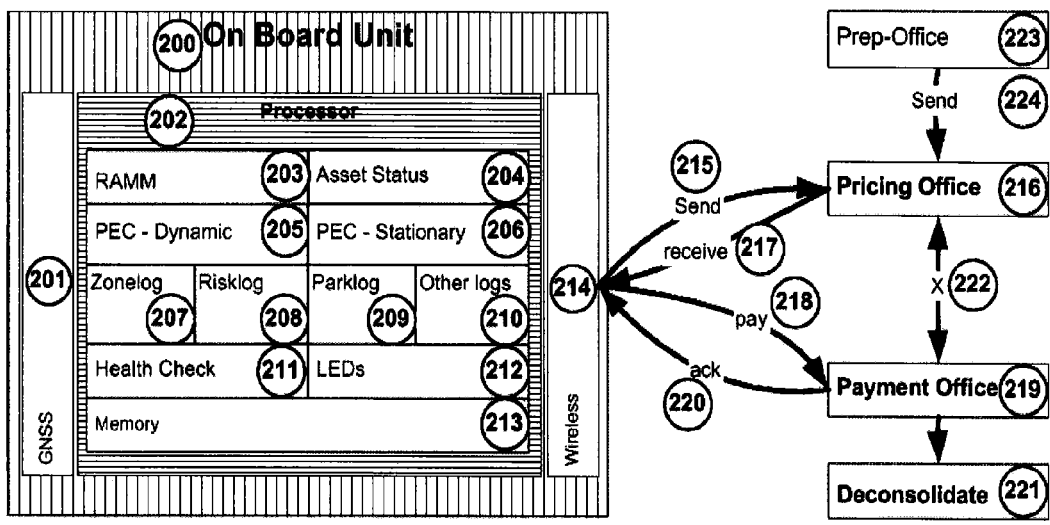
FIG. 2 is a schematic of the on-board unit of the present invention, illustrating logical components and data flows.

Since all VPS operate in this way, including the present invention, this general structure is used as the context for describing the present invention, i.e., the context in which ten new improvements or capabilities that extend and modify prior art will be presented [FIG. 2].

FIG. 1 is an overview of the fundamental approach to vehicle positioning systems (prior art). A VPS consists of a GNSS antenna and receiver 101, a processor (sometimes proprietary and may be the embodiment of that prior art) 102, memory 103, and some form of wireless communication device 104. This 101-104 is typically packaged in a single on-board unit (OBU). From there, position estimates, often encrypted and almost certainly distorted by multipath errors and with data gaps due to an insufficient number of signals to estimate a position 105 is forwarded to a payment services facility 106 that may be situated in a remote datacenter, in another device on-board the same vehicle, or even within the same device. The payment services component 106 employs a method such as map-matching to determine the correct payment due.

FIG. 2 is an overview of this invention incorporating all ten critical improvements over existing systems that are currently proposed or used for metering and payment services for tolling roads, parking, and pay-as-you-drive insurance. As in all prior art, this invention includes an OBU 200 which requires a GNSS receiver and antenna 201, a processor 202, memory 213, wireless communication 214 and a means to handle payment services 216 and 219. In this invention those existing elements are modified or complemented as follows:

A RAMM (Receiver Autonomous Multipath Mitigation) process 203 is added to mitigate multipath error. This RAMM process works in tandem with an asset status determination process 204 that determines whether a vehicle is parked or whether a journey is in progress (including moving and short stops). The output of RAMM 203 as guided by the status determination 204 includes a PEC (position estimate characterization) for a dynamic receiver 205 or a PEC for a static receiver 206, respectively. The combined output of RAMM and the PEC for a dynamic receiver is represented in two highly compressed streams: one for road use called a Zonelog 207 and one for insurance use called a Risklog 208. The combined output of RAMM and the PEC for a static receiver is represented in a third, highly compressed stream called a Parklog 209. Additional logs for additional applications can also be generated 210. The zonelogs and parklogs for a given period of time form an unbroken record continuous in time and contiguous in location that allows a robust test for tampering such as by jamming or signal blocking (for example with metal foil) which together with additional tests for hardware integrity, allows a health-analyzer circuit 211 to determine device health and data collection integrity and to signal the payment services facility 216, 219 and to set an LED sequence 212 to alert the vehicle operator and/or an enforcement agent. The data from these processes 207, 208, 209, 210, 211 is compressed and stored 213 as the evidentiary documentation for position history.

This evidentiary document is encrypted and forwarded 214, 215 without vehicle ID on schedule or on-demand to a pricing facility whose referred embodiment is a remote data center, but which may also be on-board and even within the same device housing 216, 219. This figure shows the expanded version of payment services which allows for near-anonymity with regards to location data. This is accomplished by forwarding, as a batch file, location and evidentiary data (zonelogs, parklogs, and risklogs) without vehicle or personal identification 215 to a pricing system 216 that is preferably external to the vehicle and a shared resource to reduce the operational costs of on-board maps, and receiving in return a payment table 217 listing all of the payable amounts and payees (tolling authorities, parking operators, insurance companies) for subsequent payment. This procedure 213-214-215-216-217-214-213 will naturally use a wireless network address that will be associated with a particular device and vehicle as well as with a transaction code, hence for the duration of the transaction it would be technically possible to associate a set of location information with a specific vehicle's registered owner, but such a possibility could be avoided and audited to prevent the required connection capability.

The pricing system 216 may then discard all data and records of the transaction, as it is simply a slave to the OBU for the purpose of computing the pricing table. The OBU then forwards the payment table 217, 218 with an account ID to Payment Management 219, which may be remote or in-car. If it is in-car, it may be paid with any form of electronic payment instrument including a cash-card for full anonymity. If it is remote, the vehicle ID may be associated with some form of payment instrument, and in that case payment would not be anonymous, although location remains private to the OBU. In all cases, the payment manager 219 must perform a payment consolidation 221 and credit the accounts of all payees listed in the payment table 217 and when settled, must acknowledge that settlement 220 to the OBU 200. The OBU may now either retain all data (for a full location audit), just the payment table(s) 217 for a financial audit, or nothing except the "PAID" status. In any case, the LED status 212 is set to indicate "account in good order".

To the extent that the OBU retains location data or payment data, a motorist may perform a partial or full audit. This could be accomplished wirelessly over short or long distances and for this reason the data in memory 213 is encrypted to prevent uninvited access.

In the event that this invention is deployed in a manner that relies only on jurisdictional privacy legislation, it is not necessary to separate the pricing system 216 from the payment system 219 via a mutual lock-out 222. In that case, they may reside within the same computing system (i.e., behind the same security walls) and the communication scheme can be simplified somewhat.

In order for the pricing system 216 to have a pricing map 223 that allows rapid processing it must be formulated in a manner that matches the zonelog format 207. In order for a pricing map to be organized to remove pricing errors due to residual multipath error it must be designed with certain spatial constraints in the Prep-Office 223 (FIG. 9). In order for a pricing map to be up-to-date for all participating vehicles at the same time it must be updated by a service that manages all necessary updates 224 with jurisdiction-wide concurrency.

The Prep-Office 223 is a price-map preparation facility that utilizes several maps such as streets, congestion zones, financial (political) jurisdictions, and terrain maps. The latter is used to determine multipath influence constraints, which are taken together in a geographic information system to derive a price map. This price map is a one-time preparation with occasional updates.

Figure 3:
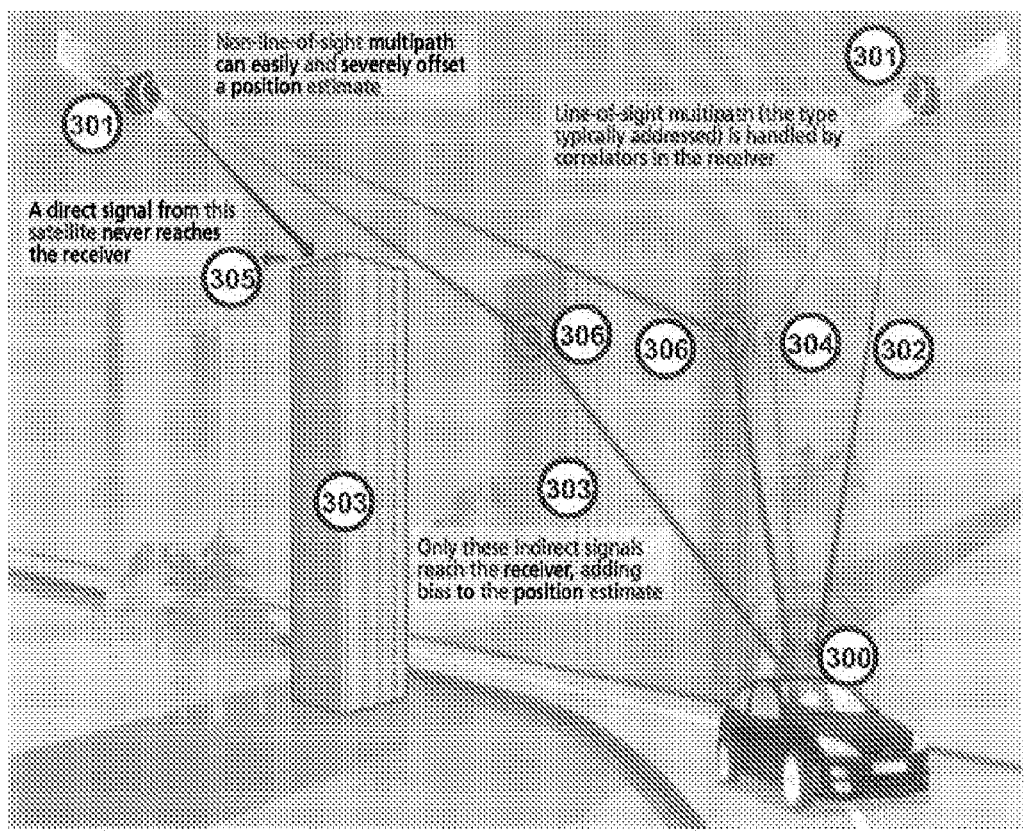
FIG. 3 is a simplified illustration of multipath signal disturbances as these affect vehicle positioning in an urban environment.

FIG. 3 is an illustration of multipath signal disturbances. A receiver in a vehicle 300 receives signals from a plurality of satellites 301. These radio signals are extremely weak, disturbed and further attenuated by a long journey through the earth's atmosphere. The designed intention of these signals is that they be received in a direct line of sight between receiver and satellite 302. In practice, in a built-up area (urban canyon) 303, signals often arrive at the receiver via multiple paths 304, 306. Such multipath reception that includes both direct 302 and non-direct 304 signals are routinely resolved at the receiver 300 via correlation methods. In certain cases, wherein a satellite vehicle has "set" behind a building or a land feature 305, relative to the receiver 300 but may still send an indirect signal 306, that reaches the receiver 300, the receiver's correlators have no way to determine that the primary signal it received from that satellite was non-line of sight. The effect of that error is to displace ("bias") the receiver away from that satellite since the inferred distance between satellite and receiver will be exaggerated often by several tens of meters. In the central business district of most large cities, this form of multipath error critically detracts from the integrity of a travel path (see the next figure).

Figure 4:
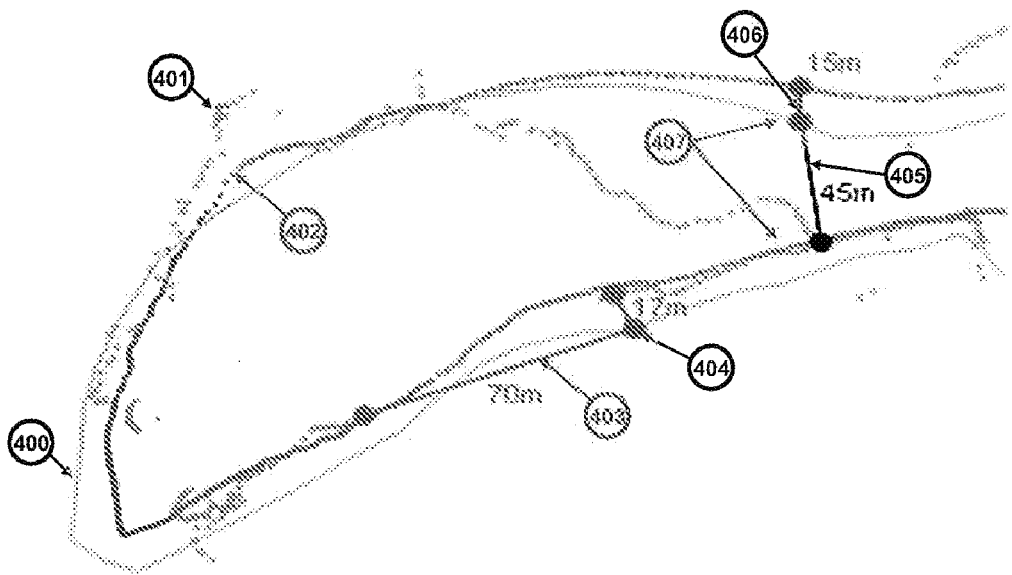
FIG. 4 is a plotted illustration of the effect of receiver autonomous multipath mitigation (RAMM) on a dynamic receiver.

FIG. 4 is an illustration of the effect of receiver autonomous multipath mitigation (RAMM) on the ability to remove errors due to both line-of sight and non-line of sight multipath for a dynamic receiver. In this illustration, a vehicle equipped with a GNSS receiver traveled smoothly at normal speeds along a road 400 (thin line) in the central business district of London (UK). The GNSS receiver used, currently considered the best in it class, incorporated "high-sensitivity" technology meaning that it picked up nearly all signals including very weak ones (without high-sensitivity, there would have been many gaps in the data). The positioning results from that receiver 401 (scattered dots) show numerous and sudden "jumps" from the road and frequent errors of 30 or more meters (in fact errors of 200 m are not uncommon). The positioning results from the RAMM process of this invention 402 (heavier unbroken dots), show smoother (no jumps), continuous (no breaks) and better road-following results. Note the 70 m error 403 that was repaired to a 17 m error 404, and the 45 m error that erroneously estimated that the vehicle was on the wrong road 405 was repaired to a 15 m error 406 and near the correct road. Also note that in one instance the position estimates from one road merged with those from another 407.

FIG. 5 is comprised of two subfigures: 5.1 and 5.2. Taken together these two figures illustrate the effect of receiver autonomous multipath mitigation (RAMM) on the ability to remove errors due to both line-of sight and non-line of sight multipath for a stationary receiver. Each such parking episode is then characterized and this improved position estimate and its characterization forms an auditable element of a parklog.

FIG. 5.1: The black broken line (scatter points) 511 show where a GPS unit estimates a receiver to be each second. The lighter unbroken line 512 shows how wavelet analysis improves these estimates. The rectangle 513 represents a car to scale, but not necessarily its true location, which is only estimated.

FIG. 5.2: This is an idealized illustration of the diminishing variance and eccentricity of the position estimate at each stage of a multi-stage RAMM process, including signal weighting 521, fault detection and elimination 522, wavelet analysis 523, cluster analysis, 524 etc. The characterization of this serial process of variance reduction and distribution Gaussification forms part of the evidentiary document.

FIG. 6 is comprised of seven subfigures: 6.1 through 6.7.

FIG. 6.1 illustrates the placement of each position estimate, $x_i$ on a GNSS grid 610. Each grid cell 611 accumulates the statistical (spatial) weight of the positional certainty (integrity) of each overlapping measurement by distributing the geometric weight of each $V_i$ 612 over the cells it overlaps. This formulation, in conjunction with high-performance RAMM provides a maximum likelihood (or "statistically most probable") path which provides an inexact, but well-behaved proxy 613 to map-matching. Since this is a very sparse matrix, it can be optimally encoded into a quad-tree or octal-tree with integrity weights at each element. It can also be compressed via the Douglas-Peucker algorithm.

In this FIG. 6.1, each ellipse represents the $3\sigma$ error bound for the position centered at that point. The striped zones hold the mean of at least one position estimate, speckled zones indicate at least one error bound has spilled over into it. White zones are excluded from the tree. Note that this is simply an illustration; the maximum likelihood path is given by hill-following along the maxima of the aggregated density function, not along the speckled zones.

FIG. 6.2 illustrates Case 1: the case of entering and leaving the same cell 620 multiple times in quick succession.

FIG. 6.3 illustrates Case 2: a more extreme case of entering and leaving the same cells 630 multiple times in quick succession. This needs to be handled differently than Case 1.

FIG. 6.4 illustrates Case 3: a yet difficult case of entering and leaving the same cells 640 multiple times over an extended period, but still on the same journey. This is more context dependent that either of the first two cases, and needs to be handled differently than Case 1 or 2.

FIG. 6.5 illustrates very noisy position data compressed into a maximum likelihood path 650.

FIG. 6.6 illustrates gaps 660 that may occur in the raw zonelog. It is possible, while thinning and pruning, or while traveling at sufficient speeds in a high-resolution grid, to have a break in a 4- or 8-connected path. This is easy to repair.

FIG. 6.7 illustrates how to adjust a pricing map (at the Prep Office System 223) so that it is not possible to overcharge a motorist. In this example using link-based pricing, it is possible to ensure that un-priced or lower-priced roads 670 that pass under or over a higher-priced highway 671 do not trigger an incorrect charge by devising a pricing map that recognizes the proximity of lower-priced roads and either zeros out or assigns the lower price to those cells' prices. The per-cell prices on the higher-priced highway may be incremented accordingly to ensure that the tolling authority is enabled to collect the correct toll amount in aggregate FIG. 7 illustrates two critical elements of a Risklog. FIG. 7.1 shows a speed profile, which is an aggregator of the number of times a particular instantaneous speed was measured. It has 161 bins 701. In this case, a driver in a business district never went above 62 k/h on this particular trip. FIG. 7.2 shows an acceleration profile, which is an aggregator of the number of times a particular instantaneous acceleration was measured. It has 61 bins. In this case, the same driver never accelerated above 10 or decelerated below 13. The interpretation of excessive speeds or aggressive acceleration would generally be location dependent.

FIG. 8 is an illustration of all three journey logs concatenated in a digraph ("directed graph") 800, with nodes 801 and edges 802. The full "journey log" comprises all journey segments whether dynamic or static and all logs, including zonelogs 803, parklogs 804 and risklogs 805 and all related evidentiary characterization (integrity measures). While the three application logs are calculated, stored and applied independently, two of them, the zonelog and the parklog, are used in combination for a powerful tamper check capability since those two logs taken jointly span the journey history from the beginning of the first parking episode to the end of the final parking episode, without temporal or spatial interruption.

FIG. 9 is comprised of two subfigures: 9.1 through 9.2.

FIG. 9.1: (simplified) Several information layers are used to construct a pricing map: a map representing expected severity of multipath signal noise is derived from an existing city terrain map 901; a street layer 902; a map of zones relative to required congestion management or political zones relative to revenue re-allocation 903. From this a final pricing map 904 for use in the Pricing System 216 is produced. This pricing map adjusts pricing zones to ensure that each congestion zones is independently adjustable, that each political zone receives its fair revenue assessment and that pricing errors cannot occur due to boundary settings in high multi-path areas (e.g. upper right of 901). [Note: there are also equivalent pricing maps for parking and insurance which are not shown.]

FIG. 10.1 is an illustration of handling parking payments and road-use payments locally and anonymously.

FIG. 10.2 is an illustration of splitting the in-car pricing and payment processor device into a remote pricing service and a payment service.

FIG. 9.2 illustrates the use of a buffer zone around a parking area to bound the multipath error characterizations from a parklog. A city street 905 lined with payable on-street parking 904 which is in turn surrounded by a sidewalk 903 and tall buildings 902. The entire parking area is bounded 901 in a GIS system within the price map preparation facility 223 to surround the entire area with a buffer that does not overlap with any other potential parking area. Two parked cars 906 illustrate a 3σ error characterization that spills over the sidewalk or into buildings, but does not spill outside of the bounding polygon 901. Hence, if the evidence from a parklog places a vehicle well within the bounding polygon, then payment is due. The parking fees for both cars 906 will have sufficient evidentiary documentation to be non-refutable. Improper parking within this polygon is a independent enforcement issue.

FIG. 10 is comprised of two subfigures: 10.1 through 10.2.

FIG. 10.1 illustrates the adoption of prior art to handle parking payments and road-use payments locally and anonymously so that no information is known outside the vehicle, except a notification that the motorist's account is paid. It also illustrates handling insurance payments remotely and privately. The OBU 1000 (also 200) forwards zonelog and parklog data 1001 to another onboard device 1002 (this device 1002 could be integrated with the OBU 1000) that uses road maps and price maps to calculate payments, execute payment services and return account balance information 1003 so that the OBU 1000 may reset its account status LEDs 212 and manages memory 213. In the event that an insurance company will not accept anonymous premium management, it would be necessary to encrypt and forward risklog data with vehicle ID 1004 to a remote premium payment process 1005.

FIG. 10.2 illustrates a novel variant on prior art to preserve location anonymity, by splitting the in-car pricing and payment processor device 1002 into a remote pricing service 1012 and a payment service 1015 which can be in-car or remote. To preserve system integrity with respect to anonymity several constraints hold: no vehicle ID can accompany the zonelog or parklog data 1011; the remote pricing server 1012 must destroy its input after its pricing calculation has been acknowledged at the OBU 1010; the billing information must be managed at the OBU 1010 (as account record-keeping hub); the billing information must be encrypted and forwarded to the payment processor 1015 as a separate transaction; and there can be no connection 1019 between the pricing 1012 and payment processor 1015; the OBU is acting as storage and transmission hub between the pricing and payment services to preserve integrity of the transaction while concealing the vehicle ID from the pricing service. Hence the pricing service does not know the vehicle ID and the payment service does not see the location information. This provides location anonymity for road-use and parking while minimizing system cost. The insurance element 1017, 1018 is handled as in FIG. 10.1 1004, 1005.

This invention uses signals from Global Navigation Satellite Systems (e.g., GPS, GLONASS and Galileo). Besides an in-vehicle (or on-asset) device, the subject system, when fully deployed may include:

One or more means to mitigate line-of-site and non-line-of-site signal multipath in steep terrain or hi-rise city landscapes One or means to provide accurate positioning One or more means to characterize positioning assurance a means to represent the travel of a moving vehicle and the accuracy of that representation a means to represent the location of a parked vehicle and the accuracy of that representation a means to represent the speed and acceleration behavior of a moving vehicle and the accuracy of that representation a means to provide extreme compression for locations of parked vehicles a means to provide extreme compression for locations of moving vehicles a means to provide extreme compression for behaviors of moving vehicles one or more means for payment management a means to prepare a geographic region for such metering one or more means to communicate wirelessly one or more means to ensure privacy a means to provide anonymity one or more means to defend against tampering one or more means of assessing and reporting device health a means of deconsolidating a payment from a single motorist's data feed into fees/charges due to multiple tolling authorities, multiple parking operators and at least one insurance firm 1. Receiver Autonomous Multipath Mitigation for Cost-Effective Accuracy Receiver Autonomous Multipath Mitigation (RAMM) is a process, embedded in an on-board hardware unit (the OBU), whereby digital signal processing is applied to raw satellite signals (i.e., prior to position estimation) and a number of other signals and measurements from the satellite system(s), plus a number of statistical processes inclusive of contextual state constraints (dynamic, stationary). This process has the effect of mitigating noise, specifically multipath and more especially non-line-of-sight multipath errors. See FIG. 3 for description of multipath and FIG. 4 to see an example of the effect of the RAMM process.

The preferred embodiment of RAMM is in the form of a purpose-designed hardware processor that is integrated into the on-board unit. This processor uses established, GNSS-specific processing plus a number of additional techniques such as signal weighting, fault detection and elimination, forward and reverse constraint analysis, wavelet transforms and analysis, and statistical pattern recognition to more effectively use raw positioning signals to calculate positions.

Each position calculation is subject to error due to a number of sources, non-line-of-sight multipath (FIG. 3) being the most difficult of these. Multipath is due to local effects specific to the momentary position and dynamics of an instance of a receiver. Incoming signals, known as pseudorange signals are generally redundant. While a minimum of four are needed to perform the position calculation, often more are received. For example, a dual GPS/Galileo receiver might receive as many as 18+ signals in open-sky, while 10-14 or less would be more typical in a build-up area, or in steep terrain.

The first significant step, signal weighting combined with a number of known GNSS signal management techniques is a common procedure and while critical is not claimed as an invention.

The second step, fault detection and elimination takes advantage of the redundancy described above. This redundancy is useful in obtaining an improved (and characterized) position estimate. Here is one example: when there are N>4 signals, for each second, compute $c=_NC_k$ ("N choose k"=N!/(k!(N-k)!)) position estimates (e.g. if (N,k)=(10,5), c=84; for (N,k)=(7,5), c=21) These c estimates form a cluster of estimates that are distributed around a mean position, x, with a covariance matrix (V) representing their spread. Use this to remove single outliers iteratively until some criteria is reached such as a minimum number of remaining points or the {x,V} of two adjacent iterations do not differ. This leaves N' points with which to calculate the final {x,V} that can be used as a characterized position estimate for that second. Fault detection and elimination differs slightly for a stationary and a dynamic antenna, and there are also a number of variations on this fundamental approach. This invention is claiming those variations, as well.

The third step, forward and reverse constraint analysis, is enabled by the fact that an auditable position log does not require a realtime response for this novel process. This means that a process that constrains the position of an antenna at time t+1 based on the reasonable dynamics of a moving vehicle or asset at time t is equally true in reverse. Hence the process that constrains the position of an antenna at time t−1 can also be based on the reasonable dynamics of a moving vehicle or asset at time t. Hence the remove of the constraint that time moves forward provides twice the opportunity to eliminate position estimate drift.

Signal weighting, fault detection and elimination, and forward and reverse constraint analysis are applied to both dynamic and stationary receivers with very minor differences.

The forth step, wavelet transforms and analysis applies wavelet transforms to data from a stationary receiver. Wavelet transforms are equivalent to a Fourier transform except wavelets are suited to statistically non-stationary data, whereas Fourier analysis assumes stationarity over the subject data to be analysed. This step provides a powerful method of removing variance, skew and kurtosis from positioning estimates from a stationary receiver (e.g., in the case of a parked car), which are otherwise too poorly behaved to derive a reliable characterization.

The fifth step, and statistical pattern recognition applies cluster analysis, such as "K-means" and its variants to separate position estimate subsets in a multimodal data distribution from a stationary receiver. This allows weighting of these clusters in a way that further removes variance, skew and kurtosis to provide for a well-behaved and more reliably characterized position estimate.

What is unique about this component (RAMM) of the invention is that its mitigation of positioning error is reliable, repeatable and superior to that of prior art. Prior art for road-tolling applications assume that navigation-grade Global Navigation Satellite System (GNSS) receivers and antenna that are incorporated are sufficient to the task. As of 2006, these receivers are not sufficient for accurate road-pricing in harsh signal environments where signals are frequently blocked or reflected (shadow, multipath). Specifically, it is possible to erroneously position a vehicle on an adjacent road 407 or in an adjacent zone, potentially causing a misstatement of the toll due.

2. Position Estimate Characterization for Evidentiary Assurance

In urban canyon, GNSS position estimates are subject to multipath error regimes (FIG. 3) that vary from moment to moment or from one place to another, even when only meters apart. From statistical perspective, the process that generates positioning noise in a GNSS tracklog is stochastic and non-stationary. In particular, if a charging system depends on location, such as in parking or road-use payment applications, then a charge derived while using the output of such a system would be easy to refute if the metering system cannot say with any measure of certainty that the associated vehicle was on a certain road, or in a specific lane, or had passed a particular cordon boundary, or had parked in an exact parking spot. Therefore, during the RAMM process, above, this invention collects statistical and process information. This includes the two- or three-dimensional covariance matrix V, its eigenvalues and eigenvectors as well as two- or three-dimensional skew and kurtosis along those eigenvectors. These permit an error characterization at each point, i.e., once every second. This position estimate characterization is used in three ways:

1. It is used during a subsequent pricing activity to determine whether the position estimate is sufficiently certain to assign a fee for use. Specifically, if the error bounds so characterized leave no doubt as to which road a vehicle traveled on or which parking lot a vehicle was parked in, then a charge would be non-refutable. However, if the error bounds leave doubt, then non-refutability would not hold.
2. It can be used directly to audit the charges for a series of parking charges.
3. It can be used to calibrate an OBU to assess whether it is working reliably or conversely whether a device that is working properly is accurate enough for a purpose. For example, if the proposed application was to determine the lane-of-travel on a multi-lane highway, position estimate characterizations would be used to ascertain whether that determination can be reliably made.

The preferred embodiment for this position estimate characterization process is that it be integrated into the same on-board unit, and into the same purpose-designed hardware processor in which RAMM (above) is embodied. The output of this process can be a full set of statistical descriptors (e.g. the first four multivariate statistical moments (in either two or three dimensions) or is can be a compressed approximation derived from those moments that might be represented by a simple vector or even a scalar that represents an error radius. In practice, the latter is more data efficient but is usually inadequate to the task.

3. Handling Dynamic and Stationary Audits in a Single Device

The nature of the errors from the processing of raw satellite signals is strongly influenced by whether the receiver is dynamic (moving) or stationary (parked). During the RAMM process 203, this invention detects very early in the process whether the receiver is stationary or moving 204 and processes differently and stores distinctly for each of the two states 205, 206—i.e., the two processes bifurcate early and remain separate throughout the remainder of the process. While two of the results, one from moving events ("zonelog") 207 and one from stationary events ("parklog") 209 are subsequently used jointly and separately as part of a device and process health check 211, their processing, formatting, storage, interpretation, and billing procedures have nothing in common except to be embodied within the same processor. This provides both computation and space advantages as well as better market coverage and installation efficiencies.

The preferred embodiment for handling of these dual states dynamic and stationary is that it be integrated into the same purpose-designed hardware processor that RAMM is embodied in and that is integrated into the same on-board unit.

The manner in which this "dynamic vs. stationary" determination is made includes either signals from an optional accelerometer (not illustrated in FIG. 2, because this device is not core to the invention), or by applying a low-pass median filter to the velocity time-series derived the first difference of the position time series. To distinguish between "stopped" and "parked" a definition such as "stopped more than M minutes" can be defined as "parked".

The use of the history of the static positions (parklog) and the dynamic positions (zonelog) to determine tampering 211 is an important element of this invention. The zonelogs and parklogs, when concatenated in correct time sequence is a digraph ("directed-graph") whose "edges" are the dynamic portions of a journey and whose nodes are the static (parked) portions of a journey. A full journey log (FIG. 6) would have no location breaks (except when traveling through a tunnel, with all instances of tunnels known to a Pricing System 216), and no temporal breaks (the OBU may be powered down when a vehicle is parked, but on re-start, the beginning and end of the parking episode will be co-terminal). Furthermore, the problem of entry to and exit of a parking garage, which may have the same behavior as entering and exiting a tunnel is handled similarly. The only possibility of temporary tamper of the OBU is defeated by a motion detector which makes it impossible to move the vehicle "during" a parking episode without being detected.

4. Parklog: High-Ratio Compression Specifically Designed for Tolling for Stationary (Parked) Receivers This component of the invention comprises methods embedded in the OBU 200 at component 209 and is the apparatus for metering the use of parking ("parking pricing"), given that signal error has been mitigated for multipath 203 and the error of its related position estimates characterized 206.

The analysis of the position of a stationary receiver in urban canyon has both a problem and an opportunity that differentiates it from solving the multipath noise problems for a dynamic receiver.

The problem is that, while an antenna is stationary, no help is available from an inertial navigation system except to confirm the stationary status, per se. Even while an antenna is stationary, multipath and especially non-line-of-sight multipath, causes an error cluster around an empirical mean that is stochastic in nature. In particular, its statistical behavior tends to be non-stationary and its distribution highly skewed, eccentric and kurtotic 501, 510—hence not amenable to Gaussian statistics.

The opportunity is that as the RAMM process 203 operates on a significant number of position estimates from a stationary receiver (turning 501 into 502), several other statistical analysis can also be applied that cannot be applied to data from a dynamic receiver. These include wavelet analysis (Fourier analysis for non-stationary processes) and cluster analysis. Hence, a partially processed cluster 511 can be further processed 512 to better pinpoint the position of a parking position 513. To extend this further, several serial stages of error mitigation (FIG. 5.3) provide an ability to demonstrate that this processing has progressed in a well behaved fashion for evidentiary value.

It is the record of the characterization of the data distributions 521, 522, 532, 524 for the data scatter at each stage (e.g. 502 and 512) that becomes the compressed record of a parking episode and provides immediate access to evidentiary value in addition to the improved position estimate, as given by the mean of the final distribution (524 in FIG. 5.3).

5. Zonelog: High-Ratio Compression Specifically designed for Tolling for Moving (Driving) Receivers.

This component of the invention comprises methods embedded in the OBU 200 at component 207 and is the apparatus for metering the use of roads ("road pricing"), given that signal error has been mitigated 203 and the error of its related position estimates characterized 205. It works for those styles of pricing known as "zone-pricing" or "congestion pricing" or "cordon pricing" and potentially other names, wherein an area, usually a portion of a municipality, is designated and all of the roads and streets in that area are tolled with prices set depending on the time of day or day of week. This is intended to specifically combat congestion. Current examples of this are the Singapore Electronic Toll Collection system (commenced 1998), the London Congestion Charge (2003) and the Stockholm Congestion Charge (2006).

This component of the invention also works for the style of pricing known as "link-pricing" or "project pricing" or "value pricing" or for the pricing of inter-urban roadways and potentially other names, wherein a specific roadway or section of a roadway is tolled. This is usually intended to fund road projects or their maintenance and sometimes to control congestion. Examples of this include the Pennsylvania Turnpike and "Highway 407" in Ontario. Under certain circumstances, it can be applied to "High Occupancy/Toll" (HOT) style pricing if the highway in question is sufficiently distant (2 to 50 meters depending on terrain and type of receiver/antenna used) from other non-priced or differentially priced roadways.

This component of the invention is specifically targeted at the circumstance experienced by those regions wherein one or more regional municipalities price inter-urban high-speed roadways and one or more price their urban core. Without an apparatus and method that handles both types of charging, motorists in such regions may require at two or more apparatuses, two or more metering methods, and two or more payment services.

This component of the invention has two major elements and each of those has several sub-components. The two major components are:

The in-car component. This component of the process 207 runs in the OBU processor 20.2.

The Pricing System 216 component. This component is realized in software running on general-purpose computers. While there is not a special apparatus at the datacenter, the specific process described in this invention is critical to complete the process begun in the apparatus (OBU) in the vehicle. The zonelog generation process 207 comprises three steps, provided that $\{x,V\}$ are already calculated 203, 205.

Zonelog Generator Step 1: In FIG. 6.1, each $\{x_i, V_i\}$ is positioned on a GNSS grid 610 at a resolution of M meters; i.e., each cell 611 is M×M meters (M might range from 2 m to 1000 m for example), each ellipse 612 represents the error spread ($V_i$) at the position estimate ($x_i$) for that second. This ellipse will overlap one or more 8-connected cells. In FIG. 6.1, ellipses are contained within 1 to 4 cells, but in general an ellipse may overlap any number of cells (FIG. 6.5), depending on the severity of multipath and the resolution of the grid. For each ellipse, compute the portion of the area of overlap for each of the underlying cells. These portions sum to 1 and represent a fraction of the distance traveled (instantaneous velocity) and the respective fraction of the sample period (likely 1 second). Add each portion to an accumulator buffer for each respective cell. This accumulator is a sparse matrix. Denote this "raw zone summary" as $Z_R$.

$Z_R$ accumulates the statistical (spatial) weight of the positional certainty (integrity) of each overlapping measurement by distributing the geometric weight of each $V_i$ over the cells it overlaps. This formulation, in conjunction with the prior stage of high-performance RAMM provides a maximum-likelihood path of travel which is an inexact, but very well-behaved proxy to map-matching. Since this is a very sparse matrix, it can be optimally encoded into a quad-tree or octal-tree with integrity weights at each element. It can also be compressed via the Douglas-Peucker algorithm prior to encoding into a tree.

Zonelog Generator Step 2: Compress $Z_R$, by finding all cells where total duration <t (too little time in this cell), search its 8-connected neighbors and add this small weight to that 4-neighbor w/the greatest weight. This conserves the summed weight of the matrix, but removes cells with inconsequential contributions. This is called spillover pruning of $Z_R$.

Zonelog Generator Step 3: Pack the remaining data into a quad-tree, $Q_j$, for the jth journey (i.e. each cell with non-zero duration, $T_e-T_s>0$). Use differential coding and integer coding wherever feasible. Each cell in this tree holds the GNSS grid designator, start time, $T_s$ (time of first sample in that cell), end time, $T_e$ (time of last sample in that cell), weighted number of seconds in the cell (sum of time fragments), and the weighted distance traveled in the cell (sum of distance fragments).

Send $Q_j$ to the Pricing System 216 based on the telecommunication protocol of the host apparatus (OBU). This invention is neutral to the specifics of this protocol and to the datacenter data management processes; hence these are not described in this application.

At the Pricing System 216 the task of price assignment is straightforward: for each cell in $Q_j$ compute the charge based on weighted distance traveled within the cell as set by the schedule price given by the midpoint time, $(T_e-T_s)/2$.

In order to complete the description of the Zonelog, the remainder of this section describes example cases to be handled at the Pricing System 216.

Case 1: Cells that have temporal overlaps (one of the cells is "touched" twice within a very short time span). In FIG. 6.2, the journey passed through cell B then A, then back through B. If the toll is a lump sum per cell (touch), then B would be charged twice. If the toll is related to duration in the zone, B would be overcharged. If related to distance within the cell (as intended by this invention), then B would be correctly charged. The tendency of multipath error to sometimes exaggerate distance traveled can be countered by using the Douglas-Peucker process to smooth the journey. (For example, a 2005 report by Siemens showed a 7.5% error in distance calculation in one built-up area; similar errors were common in a battery of 2006 tests executed by Transport for London in the UK). As an alternative, such a study for each municipality can derive a discount map related to the degree of local distance error, but this is not likely necessary.)

Case 2: A journey that hovers on the edge of two cells (FIG. 6.3). This is a degenerate instance of Case 1. This can be treated in as Case 1, but may be unfair if the pricing for cell A is very different than that in cell B. Rather, it would be seen as fairer if all of the duration and distance were assigned to the cell with the smaller charge.

It is possible to distinguish Case 1 and Case 2 by noting that in Case 1 the duration for one cell is considerably less than that for the other 621, while in Case 2 the durations are nearly coincident 631. A method to distinguish these is trivial.

Since these cells are relatively small, it is not difficult to design the price map to minimize the likelihood of case 2 happening in a circumstance where A and B are differently priced.

Case 3: As a more difficult case, FIG. 6.4 represents a trip that touched the same cells several times (such as "circling" for parking or lost in an urban context, or on a mountain switchback in a rural context). This is handled by summing all data in the same cell (location) that occurs within a time threshold. Theoretically this could happen in the OBU, but that may be too inflexible. Performed at the data center, this could be made flexible (e.g., a jurisdiction may wish to charge more for "circling" but not for the spatial circumstances of a switchback) and would be the first step and would compress $Q_j$ to the degree that a motorist was circling or otherwise driving around in a small area. Since a zonelog begins and ends with a parking episode, it is not possible for the cells to sum across trips (say on the two journeys to and from the store). Note that this step of data compression effectively loads a single cell with multiple touches and exaggerates the length of time the vehicle was in that cell, since there is only one duration per cell.

Case 4: A journey through a highly built-up area will experience extreme levels of multipath and hence error bounds may spill over beyond its immediate 8-neighborhood (FIG. 6.5). In this case, noisy positioning data (from the RAMM process) is compressed into a maximum likelihood path. In this illustration, each ellipse represents the 3σ error bounds for a single position. At 25 km per hour and one position sample per second on a 50 m grid, there would be about 52 points (and 52 ellipses) in this journey segment. This would, in this illustration, be represented by nine 4-connected cells each cell requiring less than 8 bits to encode both position and integrity. While the algorithm described handles this without difficulty, the price map 224 should be flat (i.e., no adjacent price differences) in high-multipath areas.

It is possible to thin $Q_j$ (FIG. 6.6 compared to 6.5) even while still in the OBU. Each of the occupied cells has a differential weight, and that weight would tend to climb as cells move toward the central weighting where the greatest number of means is located. If thinning pruning occurs in the OBU then it must take place prior to the spillover pruning.

While this algorithm will work either way, thinning pruning can reduce communications costs.

One observation regarding pruning, especially thinning-pruning: it is possible to cause a journey to become a disconnected path (FIG. 6.6). This is not a problem as the total journey distance represented by $Q_j$ has been conserved. As long as the pricing map is flat in these regions there will be no difference in the tolls calculated. (It is also trivial to prevent this from happening in the pruning algorithm.)

The zonelog (the fully processed $Q_j$) can be used to meter use of a toll road ("link-based" pricing) since the toll road can be represented by a tiled zone that bounds the error limits of an approved receiver traveling that road (as corrected by expected multipath disturbance in the set up of pricing maps (FIG. 9.1). In any area that another road passes through or nearby, the cells within the local error radius must be set to the minimum price of the two roads. In FIG. 6.7 the minimum is $0. Hence the user of the priced road will have a few cells free, in order to ensure that a motorist using the unpriced road is not charged for those cells. In this way no attention to direction of travel is needed in the Pricing System 216. To ensure no revenue loss, the priced cells can be adjusted to recover that loss.

Hence, the zonelog works for both congestion-zone style pricing areas and a tolled highway that is at least a cell-width (and 3σ) away from an un-tolled or a differentially-tolled highway.

In order to work successfully in the case of a tolled highway (such as "High Occupancy Tolled" style) that may run very close (parallel) to an untolled highway, a DSRC (or similar) subsystem may be added to the on-board apparatus. However, as GNSS accuracy improves with the addition of Galileo and GPS modernization and other future additions and upgrades the ability to distinguish between roadways (such as adjacent lanes) only meters apart will be reliable, especially in open sky.

This invention is not constrained to any particular cell sizes, and works, in theory, with cell dimensions of any size—whether kilometers or nanometers. Practically, however, cell sizes of 50 or 100 meters are scaled for applications such as cordon pricing in a central business district or tolling a restricted access highway ("Link-based" tolling). In order to distinguish lane of travel in adjacent lanes of a multi-lane highway, a cell size of one-half (½) the width of a lane (e.g. 2.25 m) would be appropriate for open sky applications.

6. Risklog: High-Ratio Compression Specifically Designed for Capturing Actuarial Evidence for Insurance This component of the invention comprises methods embedded in the OBU 200 at component 208 and is the apparatus for metering the use of roads for assessing operator liability premiums, given that signal error has been mitigated 203 and the error of its related position estimates characterized 205.

The GNSS receiver 201 that collects positioning signals should be high-sensitivity to ensure a high number of signals are always received, regardless of how noisy or how attenuated.

This component of the invention builds on the zonelog 207, developed above, and is used to calculate a time-marked, position-marked, risk-related signature ("Risklog") 208 for metering road use in order to calculate automotive liability insurance premiums. The application for Risklog is Pay-As-You-Drive Insurance, also known and Pay-As-You-Go or Pay-By-Mile Insurance and a number of other similar trade names.

This component of the invention, while somewhat similar, is distinct from those used for road-use charging or Transport Demand Management programs such as road-pricing, congestion-pricing or value-pricing. The Risklog may be determined and used with a lower positioning accuracy with respect to the evidentiary record required to prove use and hence to calculate a reliable premium. In addition, the Risklog includes a speed and acceleration profile which is not required for these other forms of road-use charging. Furthermore, speed and acceleration may be used as risk indicators, so while these are captured in the Risklog, they may not be useful in travel logs used for other forms of road-use pricing.

This component of the invention allows an insurer to determine, where, when, how often, how far, how fast (velocity aggregate) and how aggressively (acceleration aggregate) a vehicle was driven. Information about the location of the start and end points of each journey can be provided, the specific route taken between those endpoints can also be provided, on insurer demand.

When the specific route is retained, speed FIG. 7.1 and acceleration FIG. 7.2 data is retained that allows the optional ability of determining whether the driver was speeding. While few jurisdictions would permit the issuance of speeding citations on this evidence, this can be used to better assess risk. The specific route data is available from the zonelog 207 as previously outlined.

This component of the invention has two major elements, an in-car component 208 and a datacenter component which might be the Pricing System 216 or an independent system managed by a third party (not part of FIG. 2). This latter component is realized in software running on general-purpose computers. While there is not a special apparatus at the datacenter, the specific process described in this invention is critical to complete the process begun in the apparatus (OBU) in the vehicle.

The risklog generation process 208 comprises the following steps, provided that the time series of time-marked position data $\{x_i\}$ are already calculated 203 and characterized 205.

Each $x_i$ includes, among other data, $H_i$, where H is a horizontal position (Northing, Easting) and a time mark, T, at time i.

At each time-mark (e.g., seconds), $\Delta_i$, the distance between $H_i$ and $H_{i-1}$ is calculated in km to determine the instantaneous speed in km/hr. If one or more time-marks of data are missing (data gap) for any reason, $\Delta_i$, is calculated between the last known position and the next known position, appropriately. This distance is then subdivided equally into the correct number of time-marked segments to repair the time-series for the remaining calculations. Because a vehicle is not guaranteed to have traveled in a straight line during such a data gap, the actual trip distance may be slightly underestimated. High-sensitivity GNSS technology greatly diminishes and most often completely removes this concern. It follows also that if distance may be slightly underestimated, so too will speed be underestimated. This effect, should it occur, will be so slight that it will not detract from system efficacy.

Hence, at each time-mark, there will be a speed and an acceleration measurement. These can be accumulated in two trip-profile tables: one for speed [FIG. 7.1] and one for acceleration [FIG. 7.2]. The speed table has (for example) 161 cells (memory locations) 701 one for each of 0 km/hr, 1 km/hr, 2 km/hr . . . 160 km/hr). All speeds over 160 km/hr accumulate in the final cell. The acceleration table has 61 cells 702 representing −30 km/sec$^2$ to 30 km/sec$^2$. Hence, each cell in these two one-dimensional tables provides the count of seconds during which a certain speed or certain acceleration, respectively, was maintained.

To prevent data overflow, a technique can be used wherein anytime that a cell reaches capacity the entire table in halved and a halving counter is maintained for each table. In this way the data-size is constant regardless of the journey length. These tables are further reduced by variable compression. For example, a "first difference" and/or a run length compression may be applied.

As an alternative, the retention of the full journey information is possible and this possibility is included in this patent application. This allows determination of speeding behavior for risk assessment.

For purposes of the claims to be made on this component of the invention there is nothing special about the use of seconds, kilometers, 161 cells for the velocity table, 61 cells for the acceleration table, or the particular form of compression suggested. Any other reasonable units, cell counts or compression types would be equally suitable to the intention of this component of the invention.

The full Risklog to be forwarded to the Pricing System 216 or to a third-party datacenter consists of:

a characterized start position (an element of the associated parklog the velocity and acceleration profiles
time-date-vehicle-ID, and
overhead related to parity This is an estimated total of approximately 600 bytes per trip regardless of trip length in kilometers. Assuming four trips per day for every day of the year, this will amount to less than a megabyte per annum. While this invention is intended for wireless use, with sufficient memory, a subscriber could pre-pay insurance (as now), record for a year and have insurance adjusted (credit or a balance) for the following year without the use of wireless communication 214. However, the vehicle registrant would be required to visit a data depot for data download. As a further alternative to wireless, this data could be uploaded via a portable shortrange wand (such as Bluetooth to a PDA that is web-enabled).

As a further alternative, the full, variable-length zonelog may be included for location-based premium calculations.

7. Signal- and Pattern-Recognition-Based Methods of Remotely-Confirmable Device-Health There are a number of reasons that an OBU could fail. It could fail completely due to an unintentional mechanical (impact) or electrical (short, disconnect, battery) problem. For this type of problem, there are known methods of detection and diagnosis. For other problems including some mechanical forms of intentional tamper there are also a number of known prevention and detection methods and remedies.

Until the advent of high-sensitivity receivers, GNSS signals have been easily and frequently subjected to accidental or intentional jamming and occlusion. Because there are so many uncontrolled causes for these breaks in position lock, it has been impractical to distinguish intentional from accidental occlusion. In any case, most of these interruptions are short-lived and they have been generally tolerable and partially repairable (with inertial navigation or map-matching) in non liability-critical applications such as automotive navigation and fleet management.

In liability-critical applications, such as road pricing, it is imperative that fraud by intentional jamming or occlusion of the antenna can be detected and that the opportunity for such fraud minimized. A resolution to this problem forms part of the health check for this invention.

This component of the invention addresses the detection of signal jamming or occlusion. Since this invention specifies high-sensitivity receivers, there are only two circumstances wherein an antenna should not receive sufficient signals to fix a position: in a tunnel or in a parking garage. Both of these are easy to rectify in the Pricing System 216. Tunnels are few and permanent and will be represented on the pricing maps 224 for automatic zonelog (part of 215) repair. Parking garages are exited in proximity to the point of entry and during signal occlusion the OBU registers a parking event. If this does not happen, that implies the vehicle entered for parking decided not to park and left shortly thereafter—a brief spell of free driving. All other cases imply jamming or occlusion whether intentional or not.

Intentional jamming or occlusion for the purpose of avoiding a toll would cause an interruption in the full "journey log" (FIG. 8) that cannot be attributed to a tunnel or a parking garage (both of which can be discerned in the Pricing System 216). Since the journey log is comprised of nodes 801 and edges 802, tests for breaks can be made. Specifically: [1] a parking episode 801 must start and end within G meters; [2] a zonelog cannot have breaks greater that D meters; [3] zonelogs must start and end as and where a parking episode ends or another begins, respectively. In other words, a test for temporal continuity and spatial congruity is made within the OBU 211 and forms part of a health report regarding a specific device. The full health report, therefore, consists of measures for the physical and electrical integrity of the device (prior art) as well as the integrity of the data-stream it has been collecting (this component). In the event of suspected tamper, a health message 211 returned to the Pricing System 216 will indicate this and the LED status lights 212 will be configured appropriately.

Note that worldwide there are approximately 100 vehicular tunnels that exceed 1500 m. If D is set appropriately, a small database of the start and endpoints of all tunnels over length D can be stored in the OBU to avoid falsely setting the OBU error status LEDs 212. Suspected tampering that causes zonelog breaks less than length D can be determined at the Pricing System 216 and an error message override can be retuned to the OBU with the payment table 217 to set the LEDs appropriately.

8. Removal of Residual Price Assignment Errors

While RAMM processing for both dynamic and static receivers typically removes 50% to 80% of signal error, it does not remove all error; hence a method is needed to mitigate the effect of spatial error ("spatial error mitigation"). Furthermore, in a financial/spatial application such as road or parking tolling, we can expect to encounter any of these three problems:

1. adjacent road-charging zones with sufficiently high multipath may not be perfectly distinguishable
2. uncertainty about edge conditions, especially in the case of parking a vehicle on near the outer boundary of a parking area. This is the same spatial problem as "adjacent road-charging zones", above but the preparation and resolution for parking is different than that for road-pricing
3. overlapping road-pricing zones such as at an intersection of two or more roads that are differently priced

[1] To insure that adjacent road-charging zones in high multipath regions will not generate a toiling error (billing the motorist the wrong amount), pricing maps are developed (FIG. 9.1) with the simple constraint that any pricing boundary that is in a high-multipath area shares its pricing rules (amounts and time changes) with the adjacent area. (If the revenues from two subject areas under such consideration are due to two different tolling payees, the split of the monies under contention will have to be negotiated.)

An alternative to this is to generate a buffer zone around the lesser pricing of the two pricing regions and assign the revenues from that buffer to the maximum likelihood region but at the lower rate.

Both of these approaches may require a slight pricing increment to leave the tolling authority financially whole.

[2] To mitigate uncertainty about edge conditions in the case of parking there are three remedies:

In the case of a payable parking area that is surrounded by area(s) in which parking is not possible or legal (buildings, sidewalks, roads, etc), the bounding polygons for that non-parkable infrastructure can be included in a bounding polygon. Note that in FIG. 9.2, a vehicle stopped at a light less than M minutes, will be "stopped", not parked 204. The example in FIG. 9.2 shows street parking and a rectangular bounding polygon. This invention is generalized to and works equally well with surface, off-street lots and with any polygonal lot shape.

Forgive the parking fee if it is uncertain. An example of this is a case wherein it is not possible to be certain a vehicle is parked on a priced street or in an adjacent unpriced driveway.

Do not use this invention to service parking areas for which correct distinction cannot be made sufficiently often, unless the two parking operators can determine a common price and a fair split.

[3] To ensure correct handling of overlapping road-pricing zones such as at an intersection of two or more roads that are differentially priced, reduce the price of the higher roadway to that of the lower, and increment the remaining priced portions of the higher roadway to recover the loss. (FIG. 6.7).

The preferred embodiment for the removal of residual price assignment errors is shared between the Price Map Preparation Facility 223, the Pricing System 216 and the OBU 200. Since the pricing map is prepared 223 as a raster image with attached pricing attributes, the zonelog 207 prepared at the OBU, must be a precision match in terms of location, resolution and map projection.

9. Travel Privacy and Anonymity

Privacy in a VPS is generally provided by including pricing maps and payment management in an onboard device(s) and process. In this way, the VPS can meter use, compute a bill and confirm payment all within the vehicle. The only thing that must leave the vehicle is some form of payment completion notice so that an enforcement regime (for example license plate recognition or visual inspection of status lights on the on-board equipment) can be sure payment has been made. For clarity, this prior art approach is illustrated in FIG. 10.1.

The problem with this approach is that on-board pricing maps incur considerable initialization expense and ongoing operational costs while making pricing program options less flexible (for example providing a discount for a special area or on a special occasion).

In the case of this invention, privacy is provided without the use of on-board maps, and without a costly on-board payment management system. This is done by separating the vehicle ID (which would be associated with the registered owner of the vehicle and hence the motorist) from the geographic information that describes journeys and parking episodes. The process used in this invention is: collect and process data (invention elements 1, 2 and 3 above) in the OBU 200, 213 so that after an extended period (hours or days), a series of journeys ("zonelogs") and parking episodes ("parklogs") are ready for pricing determination 216. This information is forwarded 215,1011 with a unique transaction code and vehicle class code and without vehicle or user ID to a Pricing System 216,1012 for anonymous price determination. The Pricing System 216, 1012 then returns the transaction code and pricing matrix, P (217), which consists of K billing pairs {payee, amount owing}, one each for the K unique payees represented in the parklog and zonelogs forwarded. On receipt at the vehicle 214, the OBU then forwards a new transaction code, the vehicle ID and the pricing matrix to a payment management 219, 1015. To ensure anonymity regarding where a vehicle has been driven or parked, the pricing system and payment management centers cannot communicate. Such communication would be specifically blocked and required inter-communication would be brokered via the onboard device (as hub).

Furthermore, a repository of a vehicle's parklog and zonelog details would only be held at the on-board unit (for privacy) 200,1010. Only the pricing matrix of K payees and amounts is transmitted to the payment center. Any detailed audit requirement beyond that must be satisfied by the OBU, which requires an additional process that re-reads the OBU under motorists password control and produces a detailed audit trail. This latter feature can be provided via known technology.

The preferred embodiment for handling privacy is a hardware process mediated at the OBU but requires that the data-center functions of pricing and payment management be handled by separate functions that are brokered via the OBU and cannot communicate independently.

For full anonymity while still using a remote pricing capability (to avoid the operational expense of correct pricing maps in the vehicle), a payment capability can be moved on board 1015 and prepaid smart cards (or equivalent) can be used for payment. In this case, only a visible light sequence on the OBU would indicate payment has been made, or alternatively the OBU can signal "payment made" to an enforcement center so that the vehicle's number plates are recognized as "paid" by a license plate recognition system.

10. Payment Deconsolidation

Prior art for on-board transportation billing-related devices, usually service a single infrastructure provider (for example, the on-board device that registers payable events for highway 407 near Toronto, Canada). Recently, standards have been set, and compliant technology available, for interoperability among the same class of devices (DSRC, Dedicated Short Range Communication) in Europe. This implies that prior art is able to gather road-usage signals from one vehicle that register (and provide payment services for) the use of roads from multiple infrastructure providers (payees).

This component of the current invention exceeds the capability of prior art regarding deconsolidation of payments for location-based payment services. While this invention has to service multiple payees, as is currently done by ETC (Electronic Toll Collection) agents and telecommunication providers, but it must also serve three different classes of payees: road authorities, parking operators, and insurance companies, which requires novelty.

The preferred embodiment of this component of the invention requires both on-board and remote capabilities, with the capability of the onboard hardware being the critical element.

The on-board capability, specifically, the novel method and apparatus to capture and filter GNSS signals (203 to 209, inclusive) provides a unique basis for distinguishing among the three principal classes of payees (road, parking, and insurance). Without this device, described elsewhere in this application and process architecture (or equivalent), the ability to detect and measure 203, 204, assure 205, 206, 211 and separate 207, 208, 209, it would not be feasible to provide payment deconsolidation across all three industries. The key capabilities of OBU 203-209 in this regard are: [1] the ability to unequivocally distinguish parking from driving in spite of multipath errors, [2] two different ways to handle evidentiary documentation (one for parking, one for driving) and [3] pre-packaging those evidentiary packages at the vehicle for direct feed into the appropriate pricing services for each industry sector.

The payment services capability, while the lesser element of this component of the invention, is specifically designed to receive and price the three logs, one for each sector.

Hence we claim the ability to determine and correctly deconsolidated payments for three industries with a single stream of location data.

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. Accordingly, all suitable modifications, variations and equivalents may be resorted to, and such modifications, variations and equivalents are intended to fall within the scope of the invention as described and within the scope of the claims. In particular, this invention can be applied in part or its entirety in any circumstance wherein the position of a person or asset will be recorded and audited, publicly, privately, or anonymously, in real time or with an arbitrary time delay time. Although described having reference to vehicles and vehicle positioning, it will be appreciated that the invention may be applied to other assets and objects.

The invention claimed is:

1. A computer implemented method of tracking the position of an object, the method comprising:
   receiving positioning data with respect to the object's position in timed intervals;
   calculating, by operation of one or more processors, a position estimate and associated error bound for each timed interval based upon the received positioning data;
   fitting each calculated position estimate and associated error bound to a grid of cells, wherein each cell is assigned a price in a pricing map;
   calculating statistical weight of positional certainty of each position measurement by distributing geometric weight of each associated error bound over the cells which said error bound overlaps; and
   calculating a maximum-likelihood path of travel based upon the weighted position measurements, wherein the maximum-likelihood path of travel is stored as a data set in a quad tree including a grid cell designator, weighted time in cell, weighted distance travelled in cell, time of earliest position estimate in cell, and time of latest position estimate in cell.

2. The method according to claim 1, further comprising computing, for each cell in the quad tree, a charge based on the weighted distance travelled within that cell, preferably as set by a schedule price given by the midpoint time of samples within that cell, being the time of latest position estimate in cell minus the time of earliest position estimate in cell, divided by two.

3. The method according to claim 2, wherein if the maximum-likelihood path of travel hovers on the edge of two cells having different pricing assigning to the cell with the smaller charge all of the duration and distance of those two cells.

4. The method according to claim 1, wherein the pricing map is flat in a region of relatively wide error bounds, each cell in that region having the same price as its neighbouring cells.

* * * * *